June 20, 1933. T. A. SHORT 1,915,169
SEPARATOR
Filed Dec. 26, 1929 2 Sheets-Sheet 1
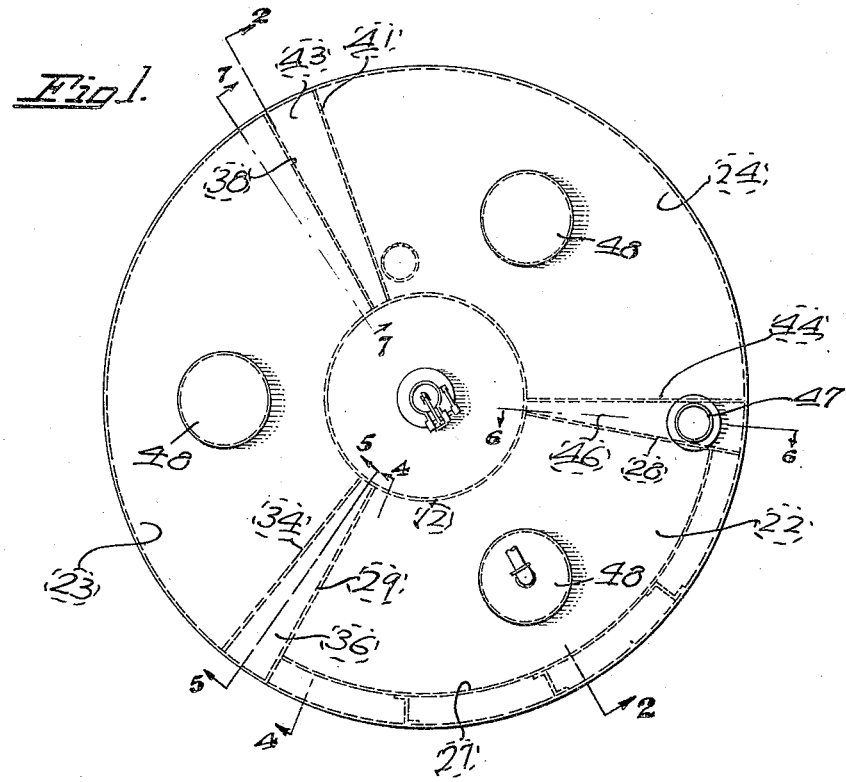
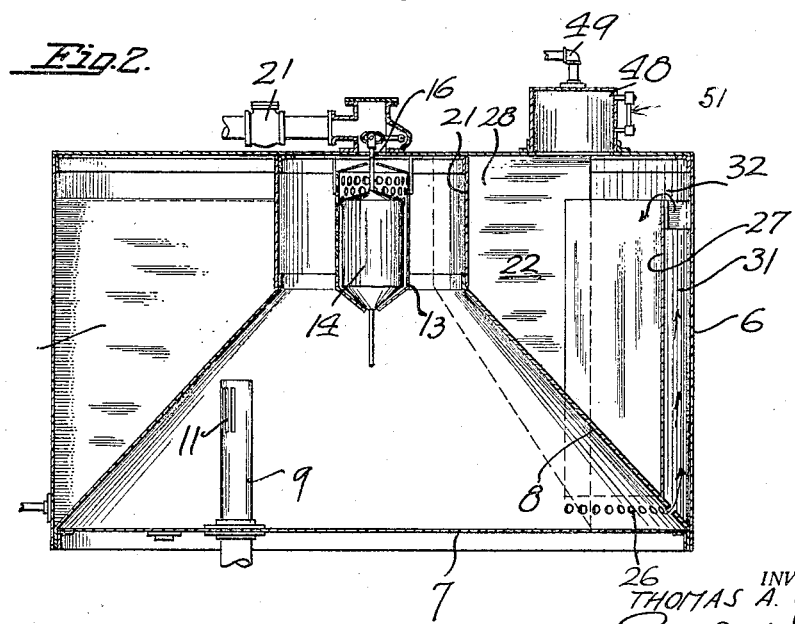
INVENTOR.
THOMAS A. SHORT
BY *Lincoln Johnson*
ATTORNEYS.

June 20, 1933.    T. A. SHORT    1,915,169
SEPARATOR
Filed Dec. 26, 1929    2 Sheets-Sheet 2
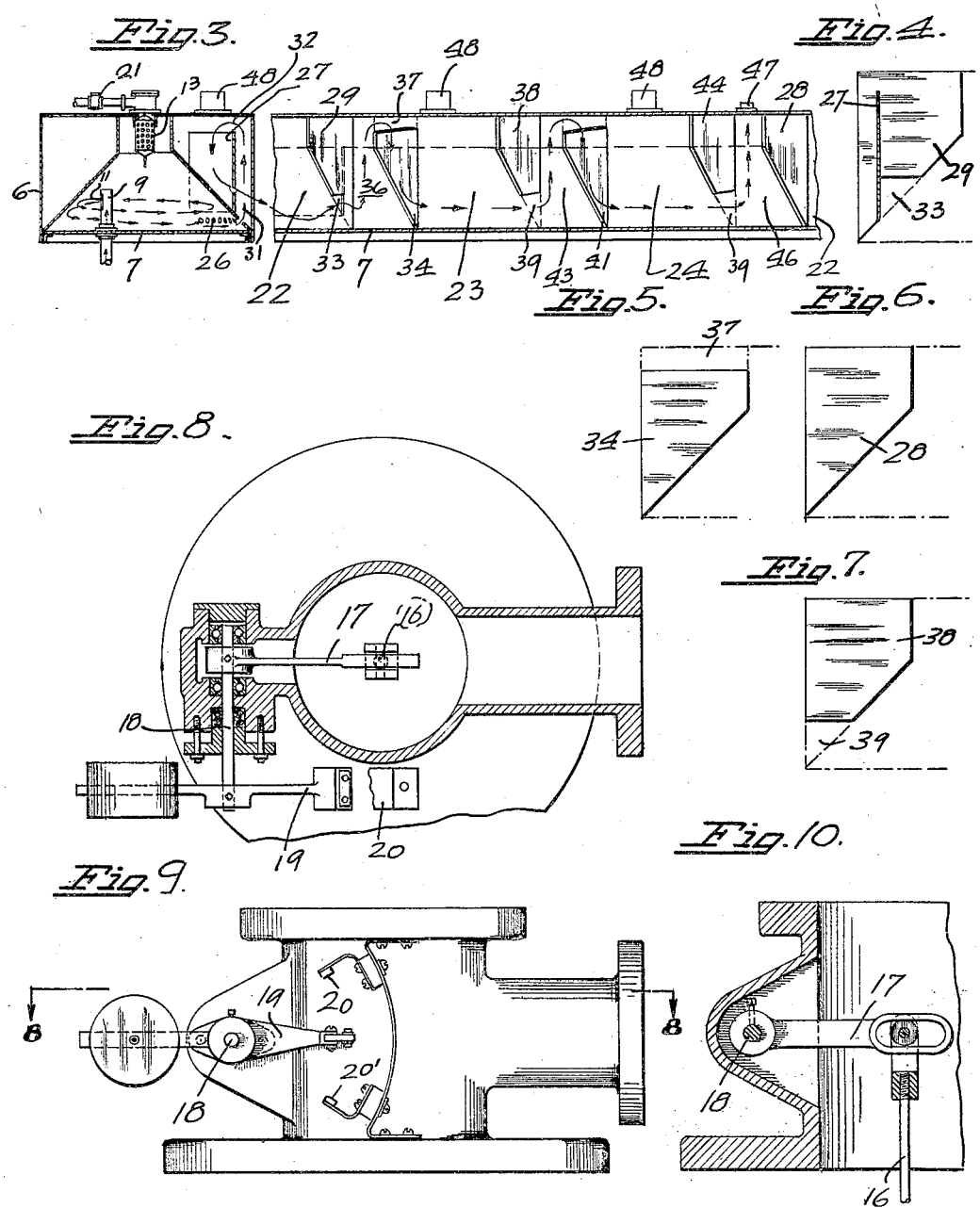
INVENTOR.
THOMAS A. SHORT
BY
ATTORNEYS.

Patented June 20, 1933

1,915,169

UNITED STATES PATENT OFFICE

THOMAS A. SHORT, OF ALAMEDA, CALIFORNIA

SEPARATOR

Application filed December 26, 1929. Serial No. 416,414.

This invention relates to separators.

It is the primary object of the invention to provide a completely inclosed separator in which liquids of different specific gravity are separated while the fluid mixture is passed thru the separator in a continuous flow; the separator acting on the principle that liquid of lighter specific gravity collects on the surface of the other liquid, and the heavier liquid may be discharged from below the separated lighter liquid, by the flow of fluid mixture to be cleaned, or separated, without carrying away the previously separated, lighter liquid; means being provided to combine a plurality of separator compartments into a compact, closed unit, capable of such automatic and continuous operation.

Another object of the invention is to provide a separator in which a fluid is transfered thru a plurality of compartments, one after another, the intake and outlet openings of said compartments being so arranged that the lighter liquid of the fluid collected on the top of the water in each compartment, is prevented from reaching the outlet of the respective compartments, thus in effect, the heavier liquid of said fluid is drained off from below a film formed by the separated lighter liquid on the top.

Another object of the invention is the provision of a separator for fluid mixtures, in which separator a lighter liquid, such as oil, collected on the top of the heavier liquid, such as water, actuates, through a float, an oil outlet valve, said separator having outlet openings thereon for the heavier fluid, through which the same is discharged from below the collected lighter fluid, and is conducted into other separating compartments, one after another; the heavier fluid being discharged from below the collected light fluid by the pressure feed of the mixture through the separator compartments.

Another object of the invention is to provide a separator comprising a central compartment, having an inlet and an outlet on the top, and another outlet adjacent the bottom thereof, and a plurality of separator compartments arranged circumferentially around the said central compartment, each compartment having an inlet opening adjacent the top thereof; and an outlet opening adjacent the bottom thereof; a transfer chamber being formed between each two adjacent separator compartments, to connect the low outlet of the preceding compartment with the high or top inlet of the next succeeding compartment; the first of said transfer chambers being connected to the outlet of the central compartment, and the last transfer chamber being connected to a discharge conduit; means being provided to remove the liquid of lighter specific gravity collected in the compartments of said separator.

Other objects and advantages are to provide a separator that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein:

Fig. 1 is a plan view of the assembled separator;

Fig. 2 is a cross sectional view of the separator;

Fig. 3 is a sectional development view of the separator;

Fig. 4 is a sectional detail of a wall with the water outlet of the separator in the first circumferential compartment;

Fig. 5 is a detail view of a plate on the inlet side of a separator compartment, the dash and dotted line indicating the intake passage;

Fig. 6 is a detail of a solid plate used on the last stage of the separator to prevent further recirculation of the fluid;

Fig. 7 is a detail of an end plate with the bottom outlet opening viewing in the direction of arrows 7—7 of Fig. 1;

Fig. 8 is a sectional plan view of the oil discharge valve of the central compartment, taken on the line 8—8 of Fig. 9;

Fig. 9 is a side view of the magnetic oil valve; and

Fig. 10 is a sectional detail view of the valve.

In carrying out my invention I make use of a substantially cylindrical casing 6, on the bottom 7 of which is formed a frusto-conical separator compartment 8. The water or other liquid to be cleaned and separated, such as the waste water aboard ships, is introduced into the central compartment 7 through an intake pipe 9, having discharge slots 11 adjacent the end thereof. The discharge end of the pipe 9 extends to a point about midway between the top and bottom of the frusto-conical compartment 7. On the top of the compartment 7 is formed a cylindrical casing 12 closed on all sides thereof. Centrally disposed and depending from the top of the casing 12 is a cage 13, having perforated sides, and a conical bottom. Within the cage 13 is a float 14, spaced from the sides of the cage 13. On the top of the cage 13 and in the top wall of the casing 12 is an oil outlet opening 16, through which extends a rod 17 of the float 14. The float 14 is also properly guided by another rod slidable through a corresponding central aperture in the bottom of the cage 13.

The float 14 is so constructed that it floats in water but it sinks in oil. In connection with other liquid mixtures, the float would be so designed that it will float in the liquid of heavier specific gravity, but it will sink in the liquid of lighter specific gravity of the particular fluid mixture used. When the separator is filled with water, the float 14 floats into its uppermost position, the movement thereof turns a lever arm 17, and a shaft 18 secured at the fulcrum of the lever arm 17. A counter balanced electrical contact lever 19 is moved by the turning of the shaft 18, into contact with the upper electric terminal 20, of the circuit, of a magnetic valve 21, thus closing the said valve 21. As the oil collects on the top of the water, the float sinks, gradually, until the thickness of oil layer reaches the bottom of the cage, at which time the float 14 rests upon the bottom of the cage 13. The downward movement of the float 14 turns the contact lever 19 downwardly until at the lowermost position of the float 14, the contact 19 is in engagement with the lower contact 20', whereby the valve 21 is opened, permitting the discharge of the oil therefrom by the displacing action of the liquid incoming into the compartment 9. During the withdrawal of the oil, the float 14 is prevented from being lifted by the rush of the fluid flow, by the protecting shield formed around it by the cage 13. The fluid flows to the float, not upwardly but sidewise, thru the perforations. In this manner the gradually rising float cannot close the valve 21, until it has reached its uppermost position, whereupon the contacts 19 and 20 are again in contacting position and the valve 21 is closed. This operation of the float 14 is so timed that the float 14 closes the valve 21 before any water can escape from the separator thru the magnetic valve 21. The aforementioned compartment 8 and the float structure accomplish the first stage of oil separation from water. Inasmuch as the first stage of separation does not remove all the oil from the water, I provide a plurality of separating compartments 22, 23 and 24, each being adapted to separate another layer of oil from the water. The intake and outlet openings of all the separator compartments are so arranged that the oil collected on the top of the water in each compartment is retained, but the water is drained from below the collected oil and is transferred to the next compartment. The cleaned water is discharged from the separator after leaving the last compartment 24.

The compartments 22, 23 and 24 are arranged circumferentially in the casing 6, between the outer wall of the central compartment and the inner periphery of said casing 6.

In order to withdraw the water from the central compartment 8, without disturbing the oil collected on the top of said compartment, the water outlet is disposed below the level of the water inlet 11. The water outlet comprises a plurality of perforations 26, adjacent the bottom edge of the frusto-conical central compartment 8. These perforations are formed on an arc substantially parallel with the bottom edge of the first circumferential separator compartment 22. These outlet perforations 26 are separated from the compartment 22 by a baffle wall 27, which is arcuate and extends in parallelism with the periphery of the casing 6, forming the entire outer periphery of the compartment 22. The compartment 22 is of segmental shape and the ends thereof are terminated by radial plates 28 and 29. Both plates 28 and 29 extend from the bottom to the top of the casing 6, so as to include a transfer chamber 31 between the casing 6 and the baffle 27. It is to be noted that the baffle 27 does not extend to the top of the casing 6, thus leaving a passage 32 at the top thereof. Inasmuch as the chamber 32 is inclosed on all sides except at the perforations 26 and at the passage 32, the water is forced to pass through said chamber 31, out through the passage 32 into the first circumferential compartment 22. Thus the passage 32 is the intake of the compartment 22. Consequently the water withdrawn from the bottom of the central compartment 8, is passed through the chamber 31, without separating any oil therein. The water is introduced into compartment 22 at the top. In the compartment 22 a certain amount of oil again collects on the top of the water.

The plate 29 has an outlet opening 33 at the bottom thereof, between the baffle 27 and the wall of the conical compartment 8, through which the water drains out of the compartment 22, without carrying therewith the oil collected on the top of the water. Adjacent to the plate 29 and spaced therefrom is disposed another radial partition plate 34, which, with the plate 29 and with the sides of the casing 6 and of the compartment 8, includes another transfer chamber 36. The top of the plate 34 is spaced from the top of the casing 6, providing a passage 37 thereat, so that the water drained from the compartment 22 passes from the bottom opening 33 upwardly through said chamber 36, and through the top passage 37, into the second circumferential separator compartment 23. The compartment 23 is also segmental and the other end thereof is determined by a radial plate 38, having an outlet opening 39, at the bottom edge thereof, through which the water is drained from the second circumferential compartment 23, without disturbing the oil collected on the top of the water in said second compartment.

Adjacent to the plate 38 and spaced therefrom is another radial plate 41, the top edge of which is spaced from the top of the casing 6, providing a passage 42, similarly to the plate 34. The plates 38 and 41 inclose a transfer chamber 43 between the separator compartments 23 and 24. The water drained from the bottom of the compartment 23 is fed to the top of compartment 24.

The third circumferential compartment 24 is also segmental and is terminated by a radial plate 44 which is similar to the plate 38, and has a bottom outlet 39 thereon. The plate 44 is spaced from the plate 28 and incloses an outlet chamber 46, the outlet box 47 of which chamber is connected to a suitable conduit to conduct the cleaned water from the separator to any point desired.

In operation the entire separator is usually full of water to be cleaned, and the oil is collected therefrom in four stages. The flow of water beneath the oil film collected on the top thereof is indicated by arrows in the developed view of the separator system in Fig. 3. Oil is first collected on the top of the central compartment 8, and the water flows out through the outlets 26. The water flows over the top of the baffle 27, through the intake passage 32 into the compartment 22, wherein a certain amount of oil is again separated on the top. The water then flows from below the separated oil, from compartment 22, through the outlet 23, whereupon another amount of oil is again separated on the top of the water. The water is then drained through the bottom outlet 39 into the transfer chamber 43, and is introduced into the last circumferential compartment 24, at the top intake passage above the plate 41. Another amount of oil is separated in the compartment 24 before the water is discharged therefrom through the bottom outlet on plate 44, into the outlet chamber 46 and outlet box 47.

It is to be noted that each circumferential compartment has a water inlet at a higher level than the water outlet, so that the water can flow out of the respective compartment, while the carrying away of the separated oil therewith is positively prevented. The outlet of each and every separator compartment is beneath the water level whereat the oil collects. In this manner a continuous flow of water, and a continuous separation of oil is accomplished, by which the water is thoroughly cleaned through four or more steps of separation, without any interruption of the continuous water flow through the system.

On the top of each circumferential compartment is provided a collector 48, which may be connected at will, thru a conduit 49 to a reservoir, or container, or any other system in which the separated oil is collected. An indicator 51 is provided on each collector 48, so that the amount of oil collected therein may be readily ascertained.

It is to be noted that the afore-described separator is entirely fireproof in view of the fact that it is completely inclosed, both at the bottom and at the top thereof. The inclosed separator also allows the pressure feed of the fluid thru the separator, consequently the fluid is conducted thru the separator at a higher speed than in the open type separators.

While in the afore-described illustration of the operation, the separator is described in connection with oil separation from water, it is to be understood the separator may be used with equal ease and efficiency in connection with any fluid mixture containing liquids of different specific gravities.

Having thus described this invention, what I claim and desire to secure by Letters Patent is:

1. In a device to separate mixed liquids of different specific gravities, an entirely closed container having an intake port and an outlet port thereon, such ports being arranged to allow the discharge of the liquid of heavier specific gravity from below the liquid of lighter specific gravity separated on the top of the heavier liquid; an outlet arranged adjacent the top of the container for the discharge of the separated lighter liquid by the pressure of the inflowing mixture; a valve at said second outlet; means actuated in said outlet to open said valve, when a certain amount of the lighter liquid is collected above the heavier liquid, said means comprising a float; means to operatively connect the float to the valve, said float being adapted to float in the liquid of heavier specific gravity and open the valve, and to sink in the lighter liquid to close the valve, said connecting means being adapted to keep the valve open during the rising of the float as the lighter liquid is discharged, until all the separated lighter liquid is discharged; and a cage having perforated sides and a protector shield on the bottom, depending from said outlet around said float to direct the outflow of liquid against the float sidewise.

2. In a device to separate mixed liquids of different specific gravities, an inclosed casing; a central container in the casing having an inlet conduit and an outlet port thereon; a plurality of containers formed in the casing around the central container, each having an inlet port and an outlet port; the said outlet ports being arranged below the level of the respective inlet ports, to permit the flow of the liquids of heavier specific gravity from below the liquids of lighter specific gravity collected on the top of the heavier liquids in the respective containers; means in said casing to connect the outlet port of a preceding container to the inlet port of the successive container to form a series of separator containers; and a discharge conduit to conduct the heavier liquids from the last container of the series, thereby causing a continuous flow of the heavier liquid through all the containers of the separator below the separated lighter liquid.

3. In a device to separate mixed liquids of different specific gravities, an inclosed casing; a central container in the casing having an inlet conduit and an outlet port thereon; a plurality of containers formed in the casing around the central container, each having an inlet port and an outlet port, the said outlet ports being arranged below the level of the respective inlet ports, to permit the flow of the liquids of heavier specific gravity from below the liquids of lighter specific gravity collected on the top of the heavier liquids in the respective containers; means in said casing to connect the outlet port of a preceding container to the inlet port of the successive container to form a series of separator containers; a discharge conduit to conduct the heavier liquids from the last container of the series, thereby causing a continuous flow of the heavier liquid through all the containers of the separator below the separated lighter liquid; and means on the top of each container to permit the discharge of the separated lighter liquid thereat.

4. In a device to separate mixed liquids of different specific gravities, an inclosed casing; a central container in the casing having an inlet conduit and an outlet port thereon; a plurality of containers circumferentially arranged in said casing around the central container, each having an inlet port and an outlet port; the said outlet ports being arranged below the level of the respective inlet ports, to permit the flow of liquids of heavier specific gravity from below the liquids of lighter specific gravity in the respective containers; means in said casing to connect the outlet port of a preceding container to the inlet port of the successive container to form a series of separator containers; and a discharge conduit to conduct the heavier liquids from the last container of the series, thereby causing a continuous flow of the heavier liquid through all the containers of the separator below the separated lighter liquid.

5. In a device to separate mixed liquids of different specific gravities, an inclosed casing; a central container in the casing having an inlet conduit and an outlet port thereon; a plurality of containers circumferentially arranged in said casing around the central container, each having an inlet port and an outlet port, the said outlet ports being arranged below the level of the respective inlet ports, to permit the flow of liquids of heavier specific gravity from below the liquids of lighter specific gravity in the respective containers; means in said casing to connect the outlet port of a preceding container to the inlet port of the successive container to form a series of separator containers; a discharge conduit to conduct the heavier liquids from the last container of the series, thereby causing a continuous flow of the heavier liquid through all the containers of the separator below the separated liquid; and means on the top of each container to permit the discharge of the separated lighter liquid thereat.

6. In a device to separate mixed liquids of different specific gravities, an inclosed casing; a central container in the casing having an inlet conduit and an outlet port thereon; a plurality of partitions dividing into compartments the space between the periphery of the central container and the wall of the casing, said partitions being provided alternately with openings at the bottom and at the top thereof and being arranged to prevent the flow of the separated lighter liquid from one compartment to the next but to permit the flow of heavier liquids, one of said partitions being solid; means adjacent said solid partition for conducting the discharge of the heavier liquids; a deflector element in the circumferential compartment next to the outlet port of said central container, to direct the flow of mixed liquid from said central outlet port to the top of the said adjacent circumferential compartment; and means on the top of the casing to allow the discharge of the separated lighter liquids from the respective compartments.

7. In a device to separate mixed liquids of different specific gravities, an inclosed casing; a frusto-conical central container in the casing having an inlet conduit and an outlet port thereon; a plurality of radial partitions arranged in pairs dividing the space between the periphery of the container and the wall of the casing into compartments, the partitions of each pair being provided alternately with an opening at the bottom and an opening at the top thereof to provide for an upward flow of the heavier liquids between the respective pairs of partitions from one compartment to the next; the last partition of the series being solid; a discharge element formed adjacent said solid partition to conduct the heavier liquids therefrom; a deflector element in the circumferential compartment next to the outlet port of said central container, to direct the flow of liquid from said central outlet to the top of the said adjacent circumferential compartment; means on the top of the casing to allow the discharge of the separated lighter liquid collected in the respective compartments; and a float operated valve connected to the top of the central container to control the discharge of the lighter liquids therefrom.

8. The combination with a container for liquids having an outlet controlled by the flow directly below the outlet and above the fluid level in said container, of a protector around the float to direct the liquid from the container to the outlet in a lateral direction relatively to the float to prevent the direct action on the fluid level on the bottom of the float and the irregular rising of the float by reason of the action of the force of the liquid flow.

9. The combination with a container for liquids having a float controlled outlet thereon; a perforated protector around the float to admit the liquid to the float laterally to the sides of the float, and a protecting shield on the bottom of the protector to prevent the upward flow of the liquid against the bottom of the float.

10. The combination with a container for liquids having a float controlled outlet thereon; a perforated protector around the float to admit the liquid laterally to the sides of the float, a protecting shield on the bottom of the protector to prevent the upward flow of the liquid against the bottom of the float, a control valve, and means of connection between the valve and the float to open the valve when the float is in its lowermost position and to maintain the valve in undiminished open position until the float reaches an uppermost operative position.

11. The combination with a container for liquids having a float controlled outlet thereon; a perforated protector around the float to admit the liquid laterally to the sides of the float, a protecting shield on the bottom of the protector to prevent the upward flow of the liquid against the bottom of the float; and an electrically actuated valve to control the flow from the outlet; an electric control connected to the valve and actuated by the float to open the valve when the float is in a lowermost operative position, and to close the valve when the float is in an uppermost operative position.

In testimony whereof, I have hereunto set my hand at San Francisco, California, this 2nd day of December, 1929.

THOMAS A. SHORT.